US008025552B2

(12) United States Patent
Cohen et al.

(10) Patent No.: US 8,025,552 B2
(45) Date of Patent: Sep. 27, 2011

(54) ARTIFICIAL DIETS FOR HONEY BEES

(75) Inventors: Allen C. Cohen, Tucson, AZ (US); Gordon I. Wardell, Tucson, AZ (US); Fabiana Ahumada-Segura, Tucson, AZ (US)

(73) Assignees: The United States of America as represented by the Secretary of Agriculture, Washington, DC (US); The Arizona Board of Regents on behalf of the University of Arizona, Tucson, AZ (US); S.A.F.E. Research & Development, LLC, Tucson, AZ (US)

( * ) Notice: Subject to any disclaimer, the term of this patent is extended or adjusted under 35 U.S.C. 154(b) by 0 days.

(21) Appl. No.: 11/026,283

(22) Filed: Dec. 30, 2004

(65) Prior Publication Data

US 2006/0148378 A1    Jul. 6, 2006

(51) Int. Cl.
*A01K 53/00* (2006.01)
*A23K 1/00* (2006.01)
*A23K 1/18* (2006.01)

(52) U.S. Cl. ............. 449/48; 424/442; 426/635
(58) Field of Classification Search .......... 449/48, 449/49, 1, 2; 119/51.01, 51.04; 426/635; 424/442

See application file for complete search history.

(56) References Cited

U.S. PATENT DOCUMENTS

| 330,255 | A | 10/1860 | Shaffer |
| 4,075,783 | A | 2/1978 | Burden |
| 4,153,960 | A | 5/1979 | Simoni |
| 4,331,692 | A * | 5/1982 | Drevici et al. ............. 426/310 |
| 5,603,945 | A * | 2/1997 | Isobe et al. ................ 424/442 |
| 5,834,177 | A | 11/1998 | Cohen |
| 5,945,271 | A | 8/1999 | Cohen |
| 5,955,123 | A * | 9/1999 | Daggy ....................... 426/21 |
| 6,235,528 | B1 | 5/2001 | Cohen |
| 6,506,597 | B2 | 1/2003 | Cohen |
| 6,830,499 | B1 | 12/2004 | Wills |
| 2005/0119222 | A1* | 6/2005 | Norton et al. ............. 514/54 |
| 2005/0271603 | A1* | 12/2005 | Krammer .................... 424/50 |
| 2006/0134182 | A1* | 6/2006 | Nieuwenhuizen .......... 424/442 |

OTHER PUBLICATIONS

Bernerich, S., "Artificial Diet Feeds Bees," Agricultural Research (Sep. 1982) pp. 6-7.
Debolt, J.W., "Meridic Diet for Rearing Successive Generations of *Lygus hesperus*," Ann. Entomol. Soc. Am. (1982) 75:119-122.
Cohen, A.C., "What Makes a Diet Successful or Unsuccessful?," Insect Diets Science and Technology—Chapter 4 (2004) pp. 47-74, CRC Press LLC, Boca Raton, FL.
Flores, A., and Wood, M., "New Cuisine Wins Rave Reviews from Honey Bees," Agricultural Research (Mar. 2003) pp. 12-14.

(Continued)

*Primary Examiner* — Son T Nguyen
(74) *Attorney, Agent, or Firm* — Elizabeth Sampson; Margaret A. Connor; John D. Fado

(57) ABSTRACT

The invention is directed to water-dispersible, substantially homogeneous artificial diets and diet formulations which provide honey bees with a fully nutritious, complex mixture of proteins, carbohydrates, fats, minerals, and vitamins in an easily digestible form. The diets of the invention support growth and development of honey bees, sustain brood rearing, and maintain hive vigor, and thus make possible the continuous rearing of bees using an artificial diet. The invention diets are useful for many purposes, and are particularly advantageous for providing nutrition sources for bees that are moved during commercial crop pollination or for other migratory beekeeping uses.

37 Claims, 3 Drawing Sheets

OTHER PUBLICATIONS

Flores, A., and Wood, M., "New Cuisine Wins Rave Reviews from Honey Bees," American Bee Journal (May 2003) 143(5): 368-369.

Haydak, M.H., and M.C. Tanquary, "Various Kinds of Soybean Flour as Pollen Substitutes," J. Econ. Entomol. (1942) 35:317-318.

Haydak, M.H., "Bee Nutrition and Pollen Substitutes," Apiacta (1967) 1:3-8.

Haydak, M.H., "Honey Bee Nutrition," Ann. Rev. Entomol. (1970) 15:143-156.

Herbert Jr., E.W., H. Shimanuki, and D. Caron, "Optimum Protein Levels Required by Honey Bees (Hymenoptera: Apidae) to Initiate and Maintain Brood Rearing," Apidologie (1977) 8:141-146.

Herbert Jr., E.W., and H. Shimanuki, "Consumption and Brood Rearing by Caged Honey Bees Fed Pollen Substitutes Fortified with Various Sugars," J. Apic. Res. (1978) 17:27-31.

Herbert Jr., E.W., J.A. Svoboda, M.J. Thompson, and H. Shimanuki, "Sterol Utilization in Honey Bees Fed a Synthetic Diet: Effects on Brood Rearing," J. Insect Physiol. (1980) 26:287-289.

Herbert Jr., E.W., J.T. Vanderslice, and D.J. Higgs, "Vitamin C Enhancement of Brood Rearing by Caged Honeybees Fed a Chemically Defined Diet," Arch. Insect Biochem. Physiol. (1985) 2:29-37.

Herbert Jr., E.W., "Honey Bee Nutrition" The Hive and The Honey Bee—Chapter 6 (1992) pp. 197-233, Dadant & Sons, Hamilton, IL.

International Ingredient Corporation, "BEE POL (pollen substitute)," Product Data Sheet http://www.iicag.com/beepol.php.

Mann Lake Ltd., "Bee-Pro® Pollen Substitute" Product Data Sheet http://www.mannlakeltd.com.

Sanford, M.T., "Pollen Substitute/Supplement—Recipes," A.P.I.S (1992) 10(2).

Schmidt, J.O., "Pollen Foraging Preferences of Honey Bees," Southwestern Entomol. (1982) 7:255-259.

Schmidt, J.O., and S.L. Buchmann, "Pollen Digestion and Nitrogen Utilization by *Apis mellifers* L. (hymenoptera: Apidae)," Comp. Biochem. Physiol.(1985) 82:499-503.

Stace, P., "Protein Bee Feeds and Their Economic Use," http://www.honeybee.com.au/Library/Beefeeds.html.

Standifer, L.N., W.F. McCaughey, F.E. Todd, and A.R. Kemmerer, "Relative Availability of Various Proteins to the Honey Bee," Ann. Entomol. Soc. Amer. (1960) 53:618-625.

Standifer, L.N., R.H. MacDonald, and M.D. Levin, "Influence of the Quality of Protein in Pollens and of a Pollen Substitute on the Development of Hypopharyngeal Glands of Honey Bees," Ann. Entomol. Soc. Amer. (1970) 63:909-910.

Standifer, L.N., M.H. Haydak, J.P. Mills, and M.D. Levin, "Influence of Pollen in Artificial Diets on Food Consumption and Brood Production in Honey Bee Colonies," Amer. Bee J. (1973) 11:94-95.

Standifer, L.N., M.H. Haydak, J.P. Mills, and M.D. Levin, "Value of Three Protein Rations in Maintaining Honey Bee Colonies in Outdoor Flight Cages," J. Apic. Res. (1973) 12(3):137-143.

Wardell, G.I., Power Point Presentation to the Uruguayan Beekeepers' Association, Oct. 7, 2003.

Wardell, G. I., "Developing an Artificial Diet for the Honey Bee *Apis mellifera*," Report for the Almond Board of California, Dec. 3, 2003.

Wardell, G. I., "Honey Bee Nutrition—The Search for a Better Honey Bee Diet," Power Point Presentation to the Carl Hayden Bee Research Laboratory's Liaison Committee, Sep. 15, 2004.

Wardell, G. I., "Honey Bee Nutrition—The Search for a Better Honey Bee Diet," Power Point Presentation to the Michigan Beekeepers Association, Oct. 30, 2004.

Wardell, G. I., "The Search for a Better Honey Bee Supplemental Diet," Power Point Presentation to the Almond Board of California, Dec. 1, 2004.

Wardell, G. I., "Developing an Artificial Diet for the Honey Bee *Apis mellifera*," Poster Presentation for the Almond Board of California, Dec. 2, 2004.

\* cited by examiner

ARTIFICIAL DIETS FOR HONEY BEES

STATEMENT REGARDING FEDERALLY SPONSORED RESEARCH OR DEVELOPMENT

This invention was supported in part by Grant No. 58-5301-1-507 from the United States Department of Agriculture, Agricultural Research Service. The Government has certain rights in the invention, including co-ownership.

BACKGROUND OF THE INVENTION

1. Field of the Invention

The present invention relates to artificial diets for honey bees. More particularly, the invention is directed to artificial diets and diet formulations which provide honey bees with a fully nutritious, easily digestible, complex mixture of proteins, carbohydrates, fats, minerals, and vitamins. The artificial diets of the invention sustain brood rearing and make possible the continuous rearing of bees.

2. Description of the Art

Honey bees are necessary to pollinate important agricultural crops and also to produce honey and wax for commercial markets. In the United States, honey bees produce $270 million worth of honey, beeswax, and other hive products and pollinate over $14 billion worth of crops annually.

Honey bees need a complex mixture of proteins, carbohydrates, fats, minerals, and vitamins to maintain normal growth and development. Typically, honey bees are able to acquire all of their dietary needs from available flowers or stored resources in the hive. Under normal circumstances, bees are able to forage and store enough pollen and honey to provide for their nutritional needs throughout the year. However, movement of hives create circumstances wherein normal foraging and/or stored resources are not adequate to provide bees with needed nutrition.

In the United States, 2-2.5 million hives are moved annually to provide commercial crop pollination. Migratory beekeeping places unusual stresses on the bees to the point that their stored pollen and honey resources diminish, and the nutritional state of the colony ultimately shuts down brood rearing due to a lack of available protein and nutrients. In addition, when hives are moved to a new site, there may be inadequate natural food sources at the new location and supplemental feed is required to maintain hive vigor.

Since the mid 1930s, work on artificial diets for honey bees as a replacement for pollen has been carried out. Currently known artificial diets for honey bees include liquid artificial nectars which comprise a carbohydrate or sugar source, pollen patties made of pollen and sugars, patties made of soy protein (usually solvent extracted) mixed with brewers yeast and sugar, patties made from a mixture of soy flour, Torula or brewers yeast, pollard, vegetable oil, vitamin mix and irradiated honey or malt, patties made from a mixture of Expeller press soy flour, pollard, cotton seed oil, vitamin mix and irradiated honey or malt, and Haydak diet patties made of soy meal, brewers yeast, sugar, and powered skim milk. A drawback of known artificial diets for honey bees is that they do not sustain brood rearing and thus are not suitable for the continuous rearing of bees.

Artificial diets for rearing entomophages and arthropods have been have been reported. U.S. Pat. Nos. 5,834,177 and 5,945,271 to Cohen describe a fresh and freeze-dried product, respectively, which comprise a mixture of (a) cooked whole egg, (b) a protein-lipid paste, and (c) a liquid, wherein the cooked whole egg forms a sticky, stringy substrate that retains nutrients in the protein-lipid paste in stable form. U.S. Pat. Nos. 6,235,528 and 6,506,597 to Cohen describe (1) an artificial growth medium composed of a mixture of cooked egg, liquid, and carbohydrate source, suitable for rearing zoophagous arthropods; (2) an artificial growth medium composed of a plant-based diet which includes cooked egg yolk or cooked whole egg, suitable for rearing phytophagous arthropods, including facultatively zoophagous phytophages, and (3) an artificial growth medium which includes the diet of (1) in combination with a plant-based diet which includes cooked egg yolk or cooked whole egg, which diet is suitable for rearing phytophagous arthropods, including facultatively zoophagous phytophages.

What is needed by the bee keepers and bee industry are artificial diets for honey bees that sustain brood rearing, maintain hive vigor, and maintain bee growth and development.

SUMMARY OF THE INVENTION

The present invention is directed to artificial diets and diet formulations for honey bees which provide honey bees with a fully nutritious, easily digestible, complex mixture of nutrients in amounts and proportions effective to support growth and development of honey bees, sustain brood rearing, and maintain hive vigor.

In one embodiment, the invention is directed to liquid diet formulations. In another embodiment, the invention is directed to dry stable diet formulations suitable for shipping and storage. In this embodiment, the dry formulation is mixed together with water or liquid formulation, as discussed in detail below, to form a liquid diet for presentation to the bees. The liquid diet formulations of the invention are the first artificial bee diets that sustain brood rearing and can be used for the continuous rearing of bees. Thus, the invention fills an important long felt need of beekeepers and the bee industry.

The invention also comprises methods of making and using the artificial diets and diet formulations.

The diets of the invention provide a complex mixture which includes proteins, lipids, carbohydrates, minerals, and other nutrients to provide all the dietary requirements for bees to rear multiple generations of young bees when there is an absence of natural pollen and nectar. The formulations are pH balanced to mimic the pH of natural pollen and promote a healthy gut environment in the bees. The particle size of the diet formulation particles is no greater than 35 microns. Hydrocolloids may be included to maintain the diet particles in suspension when mixed with water or liquid formulation. Optionally, anti-microbial agents may be included to prevent pre-mature deterioration of the diet. In sum, the artificial diets and diet formulations of the invention provide a liquid diet which is a smooth, pourable, evenly mixed, substantially homogeneous, small particle size, non-clumping suspension which is easily digestible by bees and which provides a fully nutritious bee diet.

The combination of ingredients in the diet formulations assure that a smooth, evenly mixed, substantially homogeneous, non-clumping mixture is obtained when the dry formulation is mixed with a liquid and that the formulation is palatable to bees and provides bees nutrients to raise multiple generations of young bees.

In accordance with this invention, it is an object of the invention to provide artificial diets and diet formulations effective to support growth and development of honey bees, sustain brood rearing, and maintain hive vigor.

A further object of the invention is the provision of a fully nutritious, easily digestible liquid diet for honey bees.

A still further object of the invention is to provide nutrition sources for bees that are moved during commercial crop pollination or other migratory beekeeping uses.

An even further object is to provide an artificial diet that supports queen rearing.

Other objects and advantages of the invention will become readily apparent from the ensuing description.

DEFINITIONS

Figure 1A:
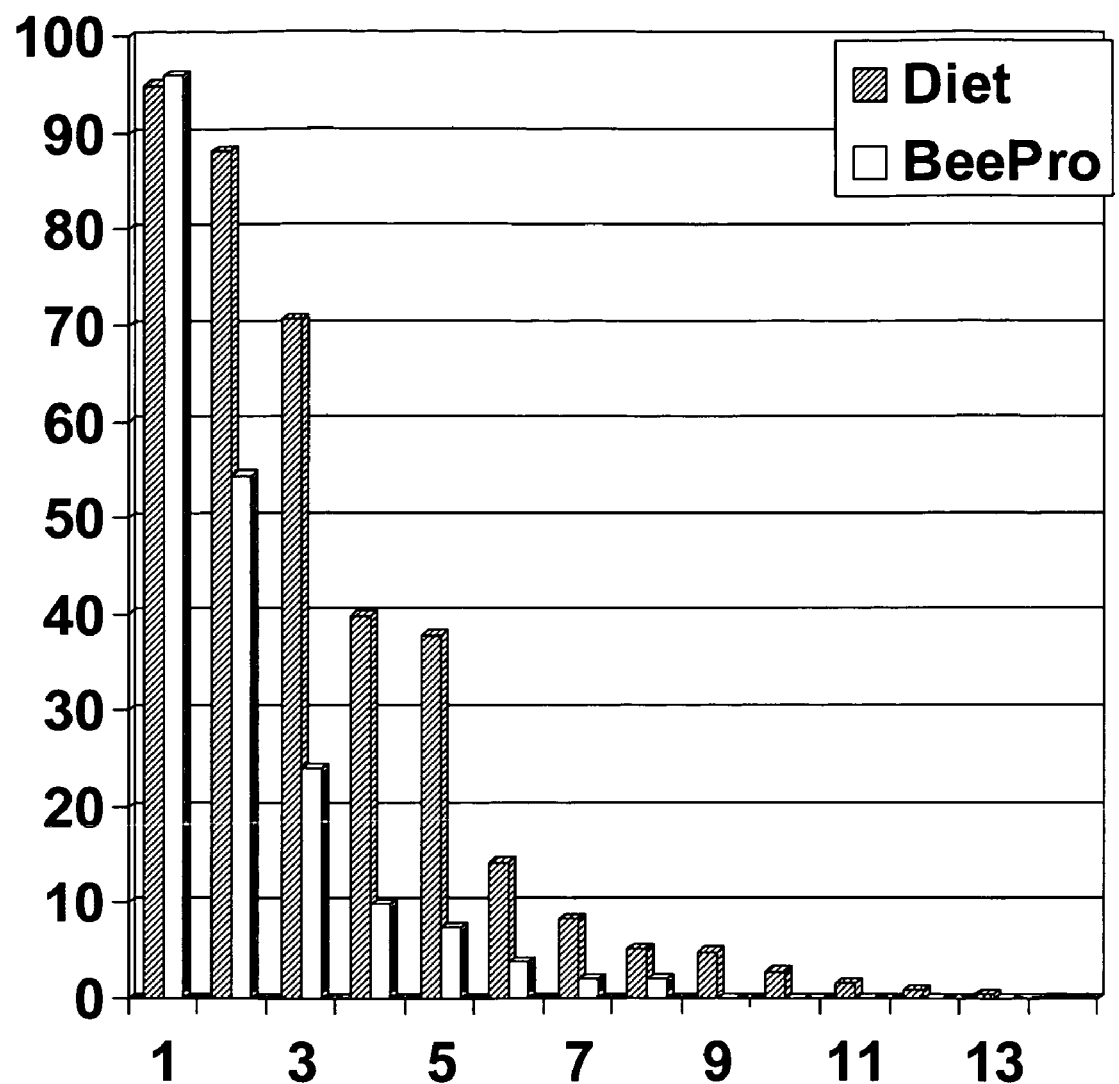
FIG. 1 shows the longevity trial data wherein the liquid diet of the invention is compared to patties prepared from Bee-Pro® (FIG. 1A), patties prepared from pollen (FIG. 1B), and compared to pollen patties, Bee-Pro® patties, and a sugar syrup solution (control) (FIG. 1C). The details of the trial are given in Example 1, below.

Unless defined otherwise, all technical and scientific terms used herein have the meaning commonly understood by a person skilled in the art to which this invention belongs. The following reference provides one of skill with a general definition of many of the terms used in this invention: *The Hive and The Honeybee*, Ed. Joe M. Graham, Dadant & Sons, Inc., Hamilton, Ill. 1975, 1992 editions.

To facilitate understanding of the invention, a number of terms are defined below.

The term "honey bee" refers to members of the Order Hymeoptera, Family Apidae and includes by way of example, the species *Apis mellifera*, and *Apis cerana*.

The term "colony" refers to a community of bees with a single queen, thousands of workers, and brood. During part of the year there are also several hundred drones. The bees live and work together as one family in a hive.

The term "comb" refers to sections of hexagonal bees wax cells built by honey bees and used to rear their brood and store honey and pollen. The cells in each comb are built back-to-back with a common interior wall. The combs are arranged in parallel series.

The term "hive" refers to the cavity/domicile occupied by a honey bee colony. The modern box hive includes a bottom board, cover, and one or more boxes, stacked one above the other. Inside, each box contains a series of movable frames of comb or foundation held in a vertical position a bee space apart.

The young of honeybees are collectively called "brood." In modern hives, the nursery area is in the "brood chamber," which is generally the bottom box.

DETAILED DESCRIPTION OF THE INVENTION

The present invention is directed to artificial diets and diet formulations for honey bees which provide honey bees with a fully nutritious, easily digestible, complex mixture of nutrients in amounts and proportions effective to support growth and development of honey bees, sustain brood rearing, and maintain hive vigor.

In one embodiment, the invention is directed to liquid diet formulations. In another embodiment, the invention is directed to dry stable diet formulations suitable for shipping and storage. In this embodiment, the dry formulation is mixed together with water or liquid formulation, as discussed in detail below, to form a liquid diet for presentation to the bees. The invention also comprises methods of making and using the artificial diets and diet formulations.

The diets of the invention provide a complex mixture which includes proteins, lipids, carbohydrates, minerals, and other nutrients to provide all the dietary requirements for bees to rear multiple generations of young bees when there is an absence of natural pollen and nectar. The formulations are pH balanced to mimic the pH of natural pollen and promote a healthy gut environment in the bees. The particle size of the diet formulation particles is 35 microns or smaller and preferably smaller than 35 microns. A hydrocolloid agent is included to maintain the diet particles in suspension when the diet formulation prepared from a dry soy source and/or a dry egg source is mixed with water or liquid formulation. Optionally, anti-microbial agents may be included to prevent premature deterioration of the diet. In sum, the artificial diets and diet formulations of the invention provide a liquid diet which is a smooth, pourable, evenly mixed, substantially homogeneous, small particle size, non-clumping suspension which is easily digestible by bees and which provides a fully nutritious bee diet.

The following Table provides the broad, preferred, and more preferred amounts of the nutrient components, pH, and particle size of the liquid diets of the invention. The ranges of the nutrient components in the dry diet formulations are determined from the Table by recalculating percentages after removal of the water component.

| Component | Broad Range | Preferred Range | More Preferred |
|---|---|---|---|
| Protein | 0.75-10% | 1.5-4.5 | 3% |
| Lipid | 0.75-5% | 1-4% | 2% |
| Carbohydrate[1] | 25-45% | 35-42% | 31% |
| Ash | 0.05-4% | 0.1%-3% | 2% |
| Cholesterol | 0.05-1% | 0.08-0.25% | 0.10% |
| Ascorbic acid | 0.02-1.25% | 0.25-1.0% | 0.50% |
| Acidifier (citric acid, etc.) | 0.1-2% | 0.30-1.8% | 0.50% |
| Hydrocolloid[2] | 0.02-3% | 0.75-1.5% | 1% |
| Antifungal agents | 0 or 0.1-1.5% | 0.25-1.0% | 0.50% |
| Water | 45-65% | 55-63% | 60% |
| pH | 3.5-7.0 | 3.7-5.5 | 3.9-4.1 |
| Particle size µM | <35 | <27 | <22 |

[1]Includes naturally occurring sugars (e.g., stachyose, raffinose etc.) and added sugar sources. The sugars are about 98-99% of the carbohydrate.
[2]Hydrocolloid only needed in solid to liquid formulation, not for the formulation that is already a liquid.

The following ingredients, in combination, provide the nutrients required for the diet formulations of the invention.

Protein and Lipid Sources. Protein and lipid sources are preferably soy sources and egg or egg product sources. The egg source is also a good source of cholesterol. The lipids in the diet include several classes that include polar and neutral lipids. All the lipids contribute a nutritional function to the diet, including essential factors such as sterols, polyunsaturated fatty acids, and lipoidal vitamins (vitamin A and vitamin E derivatives). The lipids also serve metabolically as a source of energy and as carbon sources for growth. The lipids also function as agents of sensory attraction in terms of taste and texture. The lipids serve further as emulsifiers (especially the polar lipids, including lecithin and lecithin-like substances, free fatty acids, mono- and di-glycerides) and contribute to the smoothing of the diet.

Soy Sources. Soy as a meal, flour, protein powder, or as soy milk contributes one of the most complete profiles of essential amino acids of any plant material (slightly lacking in the sulfur containing amino acids cysteine/cystine and methionine), and it is also a source of lipoproteins, which help deliver sterols and polyunsaturated fatty acids. It is a naturally lipid-rich food material. The soy used in these diets also contains a range of vitamins and minerals that are required by bees, and it contains the natural antioxidants known as isoflavones.

Examples of soy sources include soy flour or meal, soy milk, and suspended soy extract. Preferably the soy source has a percent lipid in the range of about 2 to 11%, about 3 to 10%, and preferably about 6-9%. A preferred soy flour or meal source is Expeller pressed soy flour or meal. It is prepared by defatting soybeans such as by mechanical defatting; then the soybeans are ground to the desired fineness. The product has about 6 to 9% of the natural lipids and about 42 to 50% protein. Solvent extracted soy flour is less preferred due to potential removal of nutrients and bee feeding stimulants during solvent extraction. Soy milk is a commercial product from several manufacturers including WestSoy®, unflavored. It is made by mixing water with soy flour or soy meal and mixing until the liquid can be removed and further processed such as by filtering or centrifuging. The soy source is treated at some point before or during the diet formulation preparation process to inactivate any anti-nutrients and anti-feedants in their raw state (including urease, protease inhibitors, amylase inhibitors, phytic acid, other sequestrants that act like phytic acid, lectins, and lipooxygenases) that may be present in the soy source. These substances are destroyed by heating or they can be destroyed by other processes such as enzymatic treatments, chemical purification, or fermentation.

Egg or egg product sources. Eggs, especially egg yolks, are sources of extremely high amounts of proteins that are a standard of nutritional completeness (including very high levels of the sulfur-containing amino acids that are lacking in soy and most other vegetable products). Eggs are also a rich source of lipids, including cholesterol which, as a sterol, is an essential nutrient for honey bees. The lipids in egg yolk are also rich in polar components such as lecithin, which is highly digestible, nutritious, and a natural emulsifier. Eggs also contribute texture to the diet by increasing viscosity of the completed diet, helping keep the particulate materials suspended. The eggs are a complete source of B vitamins, vitamin A (in a complex of carotenoids), and vitamin E, and are also a fairly complete source of minerals.

Examples of egg or egg product sources include dried egg or liquid egg sources, including yolks, whole eggs, or egg whites. The egg or egg product sources may be obtained from chickens, ducks, geese, turkeys and other fowl. Exemplary dried egg sources include dried whole egg, sprayed dried egg, pasteurized, spray-dried whole egg, dried powdered egg, dried egg yolk. The egg may be dried by any procedure, including for example, spray drying and freeze drying. Exemplary liquid egg sources include whole egg and egg yolk. The egg source is treated before or during the diet formulation preparation process to deactivate or detoxify any bee anti-nutrients such as lectins, protease inhibitors, and avidin that may be present in the egg source. Cooking of the egg source, including for example by spray drying, is the preferred treatment for destroying the anti-nutrients.

It is preferred that soy and egg sources are mixed together. This may be carried out with or without the presence of the other diet ingredients. This mixing can aid in preventing the clumping of egg particles during subsequent hydration with the water or liquid. The dried soy and dried egg sources with or without the other diet ingredients can be mixed together with or without grinding. Liquid soy and egg sources can be mixed or blended together with or without all the other diet ingredients.

While the preferred protein and lipid sources are soy and egg, lipid additives such as lecithin (from soy, egg yolk, wheat germ, etc.) can be used as supplements. Lecithins from soy, egg yolk, or wheat germ supply polar lipids (this includes phosphatidyl choline, phosphatidyl ethanolamine, phosphatidyl serine, ceramides, ceribrosides, and the many other polar lipids found in the general class called lecithins. Also, vegetable oils can be used as a supplement to boost lipid content. These provide triacyglycerols as a source of neutral lipids. Examples include soy oil, safflower oil, corn oil, peanut oil, sunflower oil, canola oil, rape seed oil, cottonseed oil, and flax oil. Finally, if egg yolk is eliminated from the diet formulation, a rich source of sterol would be required. Both phytosterols (beta-sitosterol, stigmasterol, campesterol, etc.) would suffice as would cholesterol or one of several cholesteryl esters.

Ascorbic Acid Source. An ascorbic acid source is included in the diet formulations as a primary nutrient serving as a source of vitamin C for the bees. Ascorbic acid is also an antioxidant.

Acidifier Source. The formula is pH balanced to mimic the pH of natural pollen and promote a healthy gut environment. Preferably, the formulation includes one or more organic acids or phosphoric acid as acidifier sources to achieve the pH stability of the diet. These sources are included in the diet formulations to maintain the pH of the formulation in the range of 3.5 to 7. As noted in the Table above, the preferred pH range is 3.7 to 5.5 and the more preferred pH range is 3.9 to 4.1. The preferred acidifier compounds are the organic acids such as citric acid, acetic acid, lactic acid, malic acid, fumaric acid, or succinic acid and combinations of organic acids such as malic acid, fumaric acid, and pyruvic acid. The inorganic acid, phosphoric acid, may also be used. Several of these acids also confer antimicrobial potential (e.g., acetic and lactic acids). Some also serve as chelating agents, which may be important to delivery of minerals and antioxidant properties (e.g., citric acid and succinic acid).

We have found that citric acid works very well in the formulations. In addition to maintaining the pH, citric acid is known to serve as a sequestrant or chelating agent, which may help deliver minerals and in chelating metallic components (such as iron and zinc).

Hydrocolloid Source. One or more hydrocolloid sources are preferably included in the diet formulations. (See *Food Chemistry*, O. R. Fennema, ed., Marcel Dekker, Inc., New York, N.Y. (1996).) These ingredients serve several purposes including helping the dry mixture go into solution and staying in solution and/or in suspension once the formulation is mixed with water or other liquids. The hydrocolloid can stabilize suspensions and oil-in-water emulsions against separation and function as a viscosity agent, emulsifier, and texturizer agent. Examples of hydrocolloid sources include xanthan gums including for example, Ketrol® xanthan gum products by CPKelco, e.g., Ketrol® RD; locust bean gum; alginates such as propylene glycol alginate, e.g., Kelcoloid® D; sodium, potassium, or calcium alginate; alginic acid; carrageenans; gum arabic; guar gum; carboxymethylcellulose; pectin; and agar. As noted above, the hydrocolloid sources fulfill the following functions: they bind water to make the water less free flowing, so they act as stabilizers+thickeners+adjuncts to emulsification. They also modify the texture of the diet, so they are texturizers. As stabilizers and thickeners, they prevent settling or separation of particulates.

Sugar Source. The sugar source in the bee diet formulations serves as a feeding stimulant, a source of carbon for building blocks for growth, a source of energy, a viscosity increasing agent (texturizer), and a humectant (water retaining agent), which lower water activity that reduces microbial growth and inhibits chemical reactions that help deteriorate diets. Also, at the high concentrations specified herein, the sugars contribute substantially to the viscosity of the diet, therefore they influence its texture and resistance to separation.

Examples of sugar sources include sucrose, e.g., crystalline or granulated sugar; other crystalline or granulated sugars, e.g., fructose, glucose (also denoted as dextrose) or maltose; high fructose corn syrup, e.g., HFCS55, or other sugar syrup. They can be used in the solid form or as a syrup.

Liquid source. Examples of liquids include water, soy milk, and diluted sugar syrups. The liquid functions to make the diet pourable and deliverable.

Anti-fungal and/or anti-microbial agents. Anti-fungal and/or anti-microbial agents are optionally added to the diet formulations to prevent premature deterioration of the formulations. These are generally required under conditions where the diet will be used for more than 24-48 hours without being used up or discarded. They are desirable even for shorter periods because at typical hive temperatures, microbes can proliferate rapidly and spoil the diet and serve as potential pathogens to the bees. The primary antimicrobial agents are sorbic acid and its salts, propionic acid and its salts, the series of parabens (methyl, ethyl, propyl, and butyl form), benzoic acid and its salts. We have found that potassium sorbate and sodium propionate work well in the formulation. Potassium sorbate, a fatty acid, has well-demonstrated anti-fungal and anti-microbial properties. Sodium propionate is an effective anti-microbial agent and approved preservative. Other anti-fungal and/or antimicrobial agents are known in the art, including for example calcium propionate.

The diet formulations are essentially free of meat products and insect parts, and preferably free of pollen, bee bread, or propolis.

Particle Size. In all cases, the particles in the final liquid diet formulation are no greater than about 35 microns, preferably no greater than about 27 microns, and more preferably no greater than about 20 or 22 microns.

Product Description. The liquid diet formulations provide an evenly mixed, water-dispersible, substantially homogeneous, substantially non-clumping, pourable, flowable liquid wherein nutrients are dissolved therein, suspended therein, and/or emulsified therein or a combination thereof. For example, ascorbic acid is dissolved in the liquid, soy particles are suspended in the viscous aqueous matrix, and there is an emulsion with the lipid/lipoprotein micelles from eggs emulsified by the apoproteins and the lecithin emulsifying the free neutral lipids. For simplicity, the liquid diet formulation may be referred to as a smooth solution or suspension. This unique composition of nutrients prepared as described herein provides a liquid bee diet "smoothy" that is palatable to the bees, easily digestible, and fully nutritious. The formulations of the invention provide a complex mixture of nutrients in amounts and proportions effective to support growth and development of honey bees. The diet formulations of the invention are the first artificial bee diets that sustain brood rearing and can be used for the continuous rearing of bees. Thus, the invention fills an important long felt need of beekeepers and the bee industry.

In another embodiment, the invention is directed to stable, dry, water-dispersible diet formulations suitable for shipping and storage. The dry diet formulations contain the dry ingredients in a form and proportion such that when the dry formulation is mixed together with water or liquid formulation, as discussed in detail below, it provides the liquid diet formulation having the properties described above. The dry diet formulations may comprise several formulations. Without being limiting, these include: (A) a composition which includes all the critical ingredients listed above, namely, lipid and protein sources, ascorbic acid source, acidifier source, hydrocolloid source, sugar source, and may include the optional ingredients, namely, anti-fungal and/or anti-microbial agent. The composition does not include water. The dry formulation is mixed with the water to form the liquid bee diet of the invention. (B) A composition which includes all the critical dry ingredients of (A) except for the sugar source and may include the optional ingredients. The dry formulation is mixed with the sugar source and water to form the liquid bee diet of the invention.

Methods of Making. The following processes may be included alone or in combination, as needed to provide the liquid diet composition of the invention: mixing, size reduction, and heating. Preferably, the dry ingredients are mixed and blended in a high speed mixer/blender to achieve complete mixing and size reduction of the particles. The mixing is carried out sufficient to render the components into a well-dispersed form that is available in a substantially homogeneous manner. Size reduction is carried out sufficient to render the components to be of a size and form so as to remain suspended in the final diet formulation and be of size acceptable to the mouthparts of the bees. In cases where the source ingredients are not greater than 35 microns, size reduction is not a required step. Heating of the components such as by high speed mixing also serves to inactivate any anti-nutrients or anti-feedants that may be present which were not previously inactivated. Heating also serves to increase the digestibility and absorption potential for components, such as proteins and to destroy microbes, especially those in vegetative phases of their life cycle. Thus, preferably heating is carried out sufficient to accomplish the foregoing but insufficient to cause excessive destruction or breakdown of the nutrients. Mixing and heating parameters for a particular set of circumstances can be readily determined by routine experimentation as shown in the methods and formulations described in detail below. The formulations may comprise the liquid diet formulation or dry diet formulations with or without the sugar source. The latter formulations are mixed with water or water and the sugar source to provide the final liquid diet formulation.

Uses of the Diets of the Invention

The artificial diets and diet formulations of the invention are useful to provide honey bees with a fully nutritious, easily digestible, complex mixture of nutrients in amounts and proportions effective to support growth and development of honey bees, sustain brood rearing, and maintain hive vigor.

In the methods of the invention, the diet or diet formulations are placed in an area where bees are located or within feeding vicinity of bees such as in or adjacent to a bee hive or bee cage. The diet or diet formulations are provided in an amount effective for providing nutrients effective to support growth and development of honey bees. Exemplary uses of the diets and diet formulations are for feeding bees and bee colonies, sustaining brood rearing, maintaining hive vigor, providing bees with nutrients to rear multiple generations of young bees, providing nutrition sources for bees that are moved during commercial crop pollination or other migratory beekeeping uses, providing a diet that supports queen rearing, and providing all the dietary requirements for bees to rear multiple generations of young bees when there is an absence of natural pollen and nectar. Other applications include:

1. Building honey bee colony populations prior to and during pollination.
2. Building honey bee colony populations prior to the honey flow.
3. Feeding to bees in queen rearing operations, the swarm boxes, cell builders, mating nucs and queen banks.
4. Use as a supplemental diet for greenhouse bumble bees.
5. Use as a carrier for therapeutic treatments in the bee colonies such as controls for parasitic mites, pathogenic bacteria, protozoans and fungi.

Specific Formulations. The following provides descriptions of specific formulations which illustrate the various formulations of the invention. Formulations I and II are formulations wherein water or water and sugar source, respectively, may be added at the time of the making the formulation or may be added when ready for use. The soy source is Expeller pressed soy flour. Formulations IIIa and IIIb are liquid formulations. Formulation IV is a liquid formulation prepared using a soy flour and egg mix. Suggested methods of making the formulations are also included in the descriptions.

Formulations I and II.

| Ingredient | Weight in g | Broad Range | Preferred Range | More Preferred |
|---|---|---|---|---|
| Formulation I | | | | |
| Expeller pressed Soy flour | 234.5 | 1.5-7% | 2.5-4.5% | 3.5% |
| Dried egg | 234.5 | 1.5-7% | 2.5-4.5% | 3.5% |
| Citric acid | 19 | 0.1-1% | 0.5-0.9% | 0.3% |
| Ascorbic acid | 19 | 0.1-1% | 0.5-0.9% | 0.3% |
| Hydrocolloid | 33 | 0.2-3% | 0.3-0.7% | 0.5% |
| Potassium sorbate | 4.7 | 0.01-0.15% | 0.05-0.09% | 0.07% |
| Sodium propionate | 4.7 | 0.01-0.15% | 0.05-0.09% | 0.07% |
| Granulated sugar | 2344 | 25-55% | 30-40% | 35.3% |
| Water | 3750 | 45-65% | 50-60% | 56.5% |
| Total Weight | 6643.4 | | | |
| Formulation II | | | | |
| Expeller pressed Soy flour | 145.8 | 1.5-7% | 2.0-2.6% | 2.2% |
| Dried egg | 145.8 | 1.5-7% | 2.0-2.6% | 2.2% |
| Citric acid | 11.5 | 0.1-2% | 0.15-0.2% | 0.17% |
| Ascorbic acid | 11.5 | 0.1-3% | 0.15-0.3% | 0.17% |
| Hydrocolloid | 21.1 | 0.2-1.5% | 0.25-1% | 0.32% |
| Potassium sorbate | 2.9 | 0.01-0.15% | 0.02-0.12% | 0.044% |
| Sodium propionate | 2.9 | 0.01-0.15% | 0.02-0.12% | 0.044% |
| Granulated sugar* | 1442 | 14-27% | 17-23% | 21.7% |
| Sugar syrup and water mix** | 5459 | 65-85% | 70-80% | 75.3% |
| Total Weight | 7242.3 | | | |

*Sucrose or Fructose or equivalent
**High fructose corn syrup (2219 g) or equivalent and water (3240 g)

In a preferred embodiment, the dry ingredients are mixed and blended in a high speed mixer/blender to achieve complete mixing and size reduction of the flour and egg particles. In cases where the source ingredients are not greater than 35 microns, size reduction is not a required step. The high speed mixing also heats the mixture to 80-90° C. for about 2 minutes. This heating can serve to inactivate any anti-nutrients that may be present which were not previously inactivated. Either water alone (Formulation I) or water+liquid sugar source, e.g., sugar syrup (Formulation II) can then be added and mixed thoroughly. The diet is now ready to feed to the bees.

Formulations IIIa and IIIb.

| Ingredient | Weight in g | Broad Range | Preferred Range | More Preferred |
|---|---|---|---|---|
| Formulation IIIa | | | | |
| Soy milk (500 ml) | 600 | 50-65% | 58-62% | 60% |
| Whole egg (fresh) | 110 | 5-15% | 9-13% | 11% |
| Ascorbic acid | 10 | 0.5-1.5% | 0.7-1.3% | 1% |
| Citric acid | 10 | 0.5-1.5% | 0.7-1.3% | 1% |
| Sugar (sucrose)* | 270 | 22-40% | 25-35% | 27% |
| Formulation IIIb | | | | |
| Soy milk (500 ml) | 600 | 50-65% | 58-62% | 60% |
| Egg yolk (fresh) | 110 | 5-15% | 9-13% | 11% |
| Ascorbic acid | 10 | 0.5-1.5% | 0.7-1.3% | 1% |

-continued

Formulations IIIa and IIIb.

| Ingredient | Weight in g | Broad Range | Preferred Range | More Preferred |
|---|---|---|---|---|
| Citric acid | 10 | 0.5-1.5% | 0.7-1.3% | 1% |
| Sugar (sucrose)* | 270 | 22-40% | 25-35% | 27% |

*or fructose or equivalent

Formulation III contains a liquid derivative of soy: soy milk (which is obtained commercially from an extract made from ground soy and extracted with water). The soy milk (e.g., WestSoy® soy milk, unflavored) is blended with whole, fresh blended egg (IIIa) or egg yolks (IIIb) and mixed with the other dry ingredients: sugar, ascorbic acid, and citric acid. The antimicrobial agents such as sodium propionate and potassium sorbate are optionally added in amounts as discussed above. In a preferred embodiment, the mixture is heated to near boiling (95-100° C. for 1-2 minutes) in a microwave or other heating source. The cooled suspension can be used immediately or stored with refrigeration until use.

Formulation IV.

| | | Formulation IV | | |
|---|---|---|---|---|
| | | | % Total | |
| Ingredient | Weight in g | Broad Range | Preferred Range | More Preferred |
| Soy flour and egg mix* | 72 | 4.5-9% | 5-7% | 5.6% |
| Ascorbic acid | 0.5 | 0.02-0.2% | 0.03-0.1% | 0.04% |
| Citric acid | 3.5 | 0.1-0.5% | 0.2-0.4% | 0.3% |
| Xanthan gum | 1 | 0.01-1% | 0.05-0.5% | 0.1% |
| Locust bean gum | 1 | 0.01-1% | 0.05-0.5% | 0.1% |
| High fructose corn syrup | 1000 | 70-83% | 73-81% | 78% |
| Water (ml) | 200 | 13.5-19.5% | 14.5-17% | 15.6% |
| Total | 1278 | | | |

*52% soy:48% egg, ground finely in a high speed grinder such as a Vitomix blender Formulation IV is variation wherein soy flour and egg are mixed and blended together in a high speed mixer/grinder/blender such as a Vitomix blender to achieve complete mixing and size reduction of the flour and egg particles. The soy flour/egg mixture contains 52% soy flour and 48% egg. As discussed above, the high speed mixing can serve to inactivate any anti-nutrients that may be present which were not previously inactivated. The other solid, dry ingredients are mixed and blended with the soy flour egg mixture and then the mixture is blended and mixed with the liquid ingredients, namely high fructose corn syrup and water. The diet is now ready to feed to the bees.

The nutrients in the Formulations I-IV are given in the following Table. This table does not include the non-nutrient functional factors such as hydrocolloids and acidifiers.

| Nutrient Class | Formulation I | Formulation II | Formulation IIIa | Formulation IIIb | Formulation IV |
|---|---|---|---|---|---|
| Protein | 3.2 | 1.8 | 2.7 | 3 | 2.9 |
| Lipid | 1.7 | 1 | 1.7 | 3.3 | 2.1 |
| Carbohydrate | 37 | 44 | 31 | 31 | 44 |
| Ash (mineral) | 0.35 | 0.2 | 0.1 | 0.1 | 0.1 |
| Water | 56 | 53 | 61 | 58 | 51 |

Dry Formulations. The following formulations are exemplary dry formulations.

| | | Formulations V and VI. | | |
|---|---|---|---|---|
| | | | % Total | |
| Ingredient | Weight in g | Broad Range | Preferred Range | More Preferred |
| | | Formulation V | | |
| Soy flour | 235 | 3.4-16.1% | 5.7-10.3% | 8.1% |
| Dried egg | 235 | 3.4-16.1% | 5.7-10.3% | 8.1% |
| Citric acid | 19 | 0.2-2.3% | 1.1-2.0% | 0.7% |
| Ascorbic acid | 19 | 0.2-2.3% | 1.1-2.0% | 0.7% |
| Hydrocolloid | 33 | 0.45-6.8% | 0.7-1.7% | 1.1% |
| Potassium sorbate | 5 | 0.02-0.34% | 0.1-0.2% | 0.2% |
| Sodium propionate | 5 | 0.02-0.34% | 0.1-0.2% | 0.2% |
| Sugar | 2344 | 57-85% | 69-88% | 81% |
| | | Formulation VI | | |
| Soy flour | 235 | 35-50% | 40-46% | 42.6% |
| Dried egg | 235 | 35-50% | 40-46% | 42.6% |
| Citric acid | 19 | 2.5-4.5% | 3.0-4.0% | 3.4% |
| Ascorbic acid | 19 | 2.5-4.5% | 3.0-4.0% | 3.4% |
| Hydrocolloid | 33 | 4-8% | 5.0-7.0% | 6% |
| Potassium sorbate | 5 | 0.5-1.8% | 0.7-1.4% | 0.9% |
| Sodium propionate | 5 | 0.5-1.8% | 0.7-1.4% | 0.9% |
| Total | 551 | | | |

Formulation V contains all the ingredients of Formulation I, above, except the water. Formulation VI contains all the ingredients of Formulation I except the sugar and water. These dry formulations provide an advantage over the liquid formulations of having less weight and bulk; therefore they can be more easily transported to the sites for use. This is advantageous where the diets are needed for migratory beekeeping uses. The dry formulations V and VI are then mixed with water or sugar and water, respectively, to provide the liquid diets as described above. Example 2 below also describes mixing protocols.

Another use of the diets of the invention is to prepare patties for presenting the diets to the bees. The patty is a mixture of water or sugar syrup and the diet formulation to form soft pliable dough-like consistency that is pressed into a thin patty and placed into honey bee colonies to support the protein and nutritional need of the colony. While the dry diet formulation can be mixed with water and or sugar syrup solution to form a liquid diet application, the same dry formulation can be mixed with lesser amounts of water or sugar syrup to form a patty or a patty can be prepared by adding less water to a liquid formulation. For example, a patty can be prepared using Formulation II above, by replacing the 5459 grams of the sugar syrup and water mix with 290 grams of water or 1245 grams of high fructose corn syrup. In a preferred embodiment, the dry ingredients are ground and mixed together, and then the liquid component is added as the mixture is being stirred either in a commercial mixer or by any means necessary to get a substantially homogeneous mixture and a smooth dough-like consistency. The resultant mixture should preferably be allowed to rest overnight to fully absorb the moisture. Then the mixture is used to form smooth, firm but moist patties. The patties are placed in an area where bees are to be fed such as in the colonies or in or adjacent to a hive or cage.

EXAMPLES

The following examples are intended only to further illustrate the invention and are not intended to limit the scope of the invention which is defined by the claims.

Example 1

The following example is a Longevity Trial wherein the liquid diet of the invention is compared with known bee diets.

Preparation of Treatments

1. Liquid Protein Diet Ingredients and Mixing Protocol.

Dry ingredients (Table 1) were ground together with a Vitamix 2400 grinder for 1 minute to create a powder. The powder was added to the tap water and mixed by hand with a spatula until a smooth solution was attained (1 minute of stirring). The mixture was refrigerated until poured into vials attached to the cage feeders containing the bees for the longevity trial. Table 1 shows the amounts of the individual dry ingredients needed to make one gallon of the liquid diet of the invention.

TABLE 1

| Ingredient | Amounts in grams |
|---|---|
| Expeller pressed Soy flour obtained from Mann Lake Ltd. | 234.5 |
| Dried egg | 234.5 |
| Citric acid | 19 |
| Ascorbic acid | 19 |
| Kelcoloid ® d | 33 |
| Potassium sorbate | 4.7 |
| Sodium propionate | 4.7 |
| Granulated sugar | 2344 |
| Tap water | 3750 |
| Total Weight | 6643.4 |

2. Pollen Cake Ingredients and Mixing Protocol.

Pollen patties were made by mixing pollen collected by honey bees to granulated sucrose, Drivert sugars (a commercially available mixture of equal amounts of dry fructose and sucrose) and tap water (Table 2).

TABLE 2

Amounts of each ingredient needed to make pollen cakes.

| Pollen | Sucrose Sugar (Granulated) | Drivert | Water |
|---|---|---|---|
| 10 lb. | 10 lb | 10 lb. | 600 to 900 ml |

Pollen and water were mixed together in a Hobart bakery mixer using the dough hook until the pollen pellets were suspended (7 to 10 minutes). The entire amount of sucrose was then added to the pollen slurry and mixed until smooth (3-5 minutes depending upon the consistency of the pollen). Drivert sugar then was added and mixed until the mixture had a dough-like consistency and pulls away from the sides of the bowl (3 minutes). The mixture was rolled between two sheets of wax paper into patties with a thickness of 0.25 inch. Pollen cake patties were stored in a −20° C. freezer. The patties were thawed to room temperature prior to placing them into the cages with the bees.

3. Bee-Pro® Ingredients and Mixing Protocol.

Bee-Pro® is a commercially available soy flour-based bee diet (Mann Lake Ltd.). All ingredients (Table 3) were mixed together by hand with a spoon in a bowl to a slurry and left overnight to thicken into a smooth dough-like consistency. The thickened Bee-Pro®-based diet was stored in plastic bags and kept at 4° C.

TABLE 3

Ingredients used to make 1 lb of Bee-Pro ® patties.

| Bee-Pro ® | Sucrose | Fructose 55 |
|---|---|---|
| 2.7 oz | 8.0 oz | 5.1 oz |

4. Sugar Syrup Solution Ingredients and Mixing Protocol

A mixture of equal weights of dry sucrose and hot tap water were mixed until the sugar was completely dissolved. The finished solution was stored in containers at room temperature. Sugar syrup was placed into the cages with the bees within 24 hrs after mixing. The sugar syrup was used as the control.

Measuring Longevity

To determine if the liquid protein diet affects longevity of adult worker bees, we followed the procedural methods for a caged longevity study described by Schmidt et al. (1987). Five frames of sealed brood within 24 hrs of emergence (here after referred to as emerging brood) and were placed in a screened emergence box. All adult worker bees were brushed from the frames prior to placing the frames in the box so that all adult bees on the frames would be newly emerged. The emergence box was placed in an environmentally controlled room (incubator room) at 32°-34° C. and ≧70% relative humidity. To test the longevity of bees fed the liquid protein diet, newly emerged worker bees were removed from the emergence box and weighed. 10 g of bees (approximately 100 workers) were placed in a wooden box (20.0 cm width and 15.5 cm height) equipped with a glass tube containing 20 ml of liquid protein diet that was dispensed into a trough (1 cm wide 3.3 cm long) for feeding. Each cage was provided with a 3.5 by 7 cm strip of honey bee foundation wax on which the bees were intended to cluster. Water was provided ad libidum through a 30 ml plastic screw cap bottle with feeding holes.

To compare the longevity of bees fed Bee-Pro®, pollen cake or a 50% sucrose and water solution (controls) with those fed the liquid protein diet, six grams (approximately 60 worker bees) of newly emerged bees were placed in feeding cages (9×6×15 cm) made of Plexiglas and screen. Each cage was provided with a 3.5 by 7 cm strip of honey bee foundation wax on which the bees were intended to cluster. Bees were supplied with 40 g of Bee-Pro® or pollen in a plastic dispenser. The cages also contained 50% sugar solution and water containers. The bees were fed ad libidum. Water and 50% sugar syrup was provided as needed to the control cages. All cages were placed in an incubator room at temperatures between 32-35° C., constant darkness, and 70% relative humidity.

Five cages were used for each treatment. Mortality in each cage was recorded three times weekly by removing and then counting the number of dead bees in the cages. Weekly mean survivorship for each treatment was compared with the controls using a one-way analysis of variance.

TABLE 4

Components placed in each cage for the different treatments in longevity test.

| Treatment | Sugar Syrup | Water |
|---|---|---|
| Liquid diet |  | X |
| Bee-Pro ® | X | X |
| Pollen | X | X |
| Control | X | X |

Total hemolymph protein from adult bees fed the various Analysis of Hemolymph Proteins from Each Treatment. treatments was analyzed using the methods outlined in Bradford (1976)[1]. Hemolymph was extracted from the dorsal vessel of five bees from each treatment using a pointed micropipette to puncture the body wall near or over the heart. The hemolymph was collected with 10 µl capillary tubes and pooled for each treatment in microcentrifuge tubes. The sample was put in ice to prevent denaturing of the proteins. 5 µl of hemolymph was taken from each pooled sample and added to 200 µl of saline buffer in a 1.5 ml microcentrifuge tube. The mixture was centrifuged at room temperature for 1 minute at 15,000 g to remove hemocytes. The supernatant was stored at −20° C. until analysis.

[1]Literature Cited: Bradford, M. M. 1976. A rapid and sensitive method for the quantification of microgram quantities of protein utilizing the principle of protein-dye binding. Ann. Biochem. 72: 248-254.

The supernatant was analyzed for total protein content using a Coomassie Plus™ Protein Assay Kit (#23236) (Pierce Inc., Rockford, Ill.). The kit contains a concentrated form of Coomassie blue G-250 that was diluted 1:4 with distilled water before use. Bovine serum albumin was used as a protein standard and has a typical color response curve for spectrophotometric analysis between 25-2000 µg per ml. 100 µl of the diluted hemolymph sample (supernatant) was placed into 3.0 ml of the diluted Coomassie blue G-250 in glass test tubes. For comparison purposes, we created a blank composed of 100 µl of saline buffer added to 3.0 ml Coomassie blue G-250. The samples were analyzed for total protein content using a Spectronic 20 spectrophotometer. Absorbance values generated from the spectrophotometer were converted to µg/ml by comparing them with the protein standard curve (Bovine serum albumin).

Figure 1B:
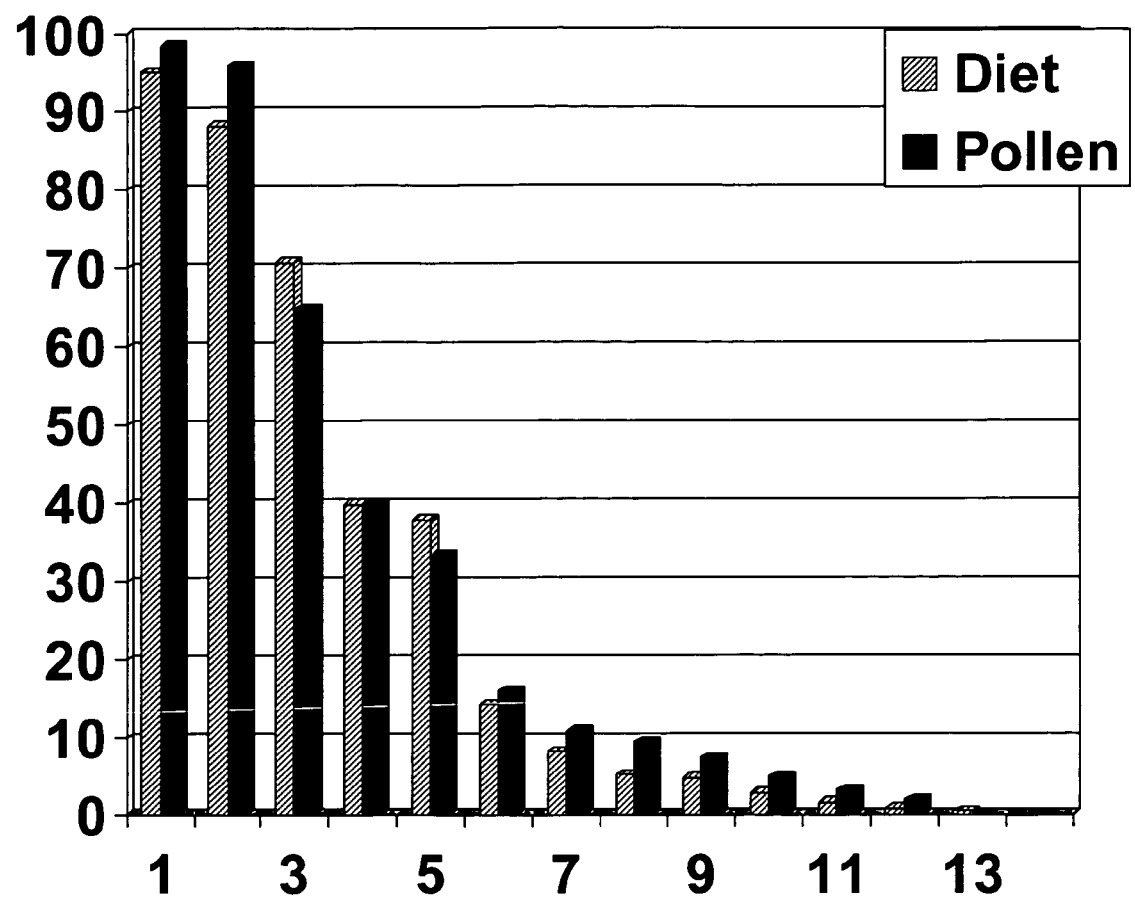
Figure 1C:
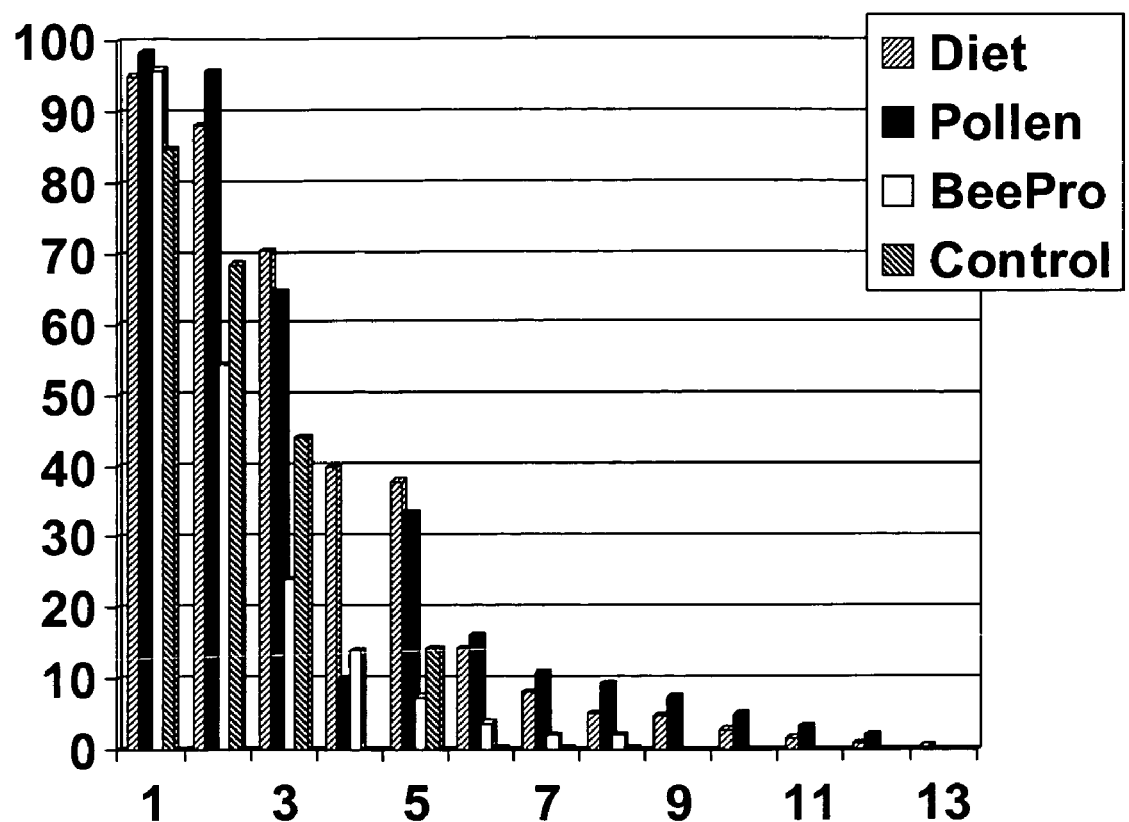

The results of the longevity trial are shown in FIGS. 1A-1C. The results show that the diet of the invention works as well as pollen in insuring worker longevity. The hemolymph protein levels (after 15 days) are higher in the liquid diet of the invention fed to the bees compared with the hemolymph protein levels of the bees fed Bee-Pro® or pollen. After week-2, the average longevity of bees fed the liquid diet of the invention was greater than those fed Bee-Pro® (t-test: t=6.17, p=0.0035). Longevity of bees fed pollen was greater than those fed on liquid diet until week-3 through week-13 when there was no significant difference in longevity between workers fed pollen and those fed the liquid diet of the invention. These results show that the diet of the invention is effective to support growth and development of honey bees, sustain brood rearing, and support continuous rearing of bees, and maintain hive vigor.

Example 2

The following example describes a large scale preparation of a dry diet formulation of the invention and dry diet mixing instructions.

Materials and Methods: The formulation to prepare 998 kg of dry diet was:

| Kg of Ingredient | Mean Particle Size, microns |
|---|---|
| 474.5 Kg of Expeller press soy flour from Mann Lake Ltd. | 18.12 |
| 474.5 Kg of pasteurized, spray dried whole egg | 20.65 |
| 5.2 kg of ascorbic acid | 26.8 |
| 33.3 Kg of citric acid | 7.6 |
| 10.2 Kg of Keltrol ® RD | 183.7 |
| Mixed Diet Total Kg: 997.7 | 14.72 |

The dry ingredients are mixed and blended in a high speed mixer/blender to achieve complete mixing and size reduction of the particles. The mean particle size of the mixed dry diet formulation was about 14.72 µm.

Preparation of the Liquid Protein Diet.

The dry diet formulations were provided to beekeepers with the following instructions for mixing the liquid formulation depending on the amount of diet to be prepared.

Dry Diet Mixing Directions

1—combine the high fructose corn syrup 55 with the water in a container. If using sucrose syrup, make a 1:1 sucrose solution and replace the fructose/water mix below. It is not necessary to heat the syrup—room temperature is fine.

2—In the laboratory we have used a plaster mixer attached to a variable speed drill to mix small and medium size batches of the diet. For larger quantities a tank mixer can be used, however, longer mixing time may be required depending on how vigorously the mixer agitates.

3—Once the liquids are mixed, add the contents of the dry mix powder and keep mixing at a moderate speed for additional 2 minutes.

4—Increase the speed of the mixer and agitate well for approx. 10 minutes or until any lumps have dissolved.

5—The diet is now ready to be fed to the bees.

To Prepare 1 Gallon
    0.85 lb dry diet mix
    3 quarts=90 fluid ounces of high fructose corn syrup 55
    0.8 quarts=2¾ cups of water
    (or for 1:1 sucrose syrup—4 quarts 1:1 sucrose mix)

To Prepare 10 Gallons
    8.5 lb dry diet mix
    8 gallons of high fructose corn syrup 55
    2 gallons of water
    (or for 1:1 sucrose syrup—10 gal 1:1 sucrose mix)

To Prepare 60 Gallons
    50 lb dry diet mix
    46.4 gallons of high fructose corn syrup 55
    12.6 gallons of water
    (or for 1:1 sucrose syrup 60 gal 1:1 sucrose mix)

To Prepare 75 Gallons
    63.7 lb dry diet mix
    59 gallons of high fructose corn syrup 55
    16 gallons of water
    (or for 1:1 sucrose syrup 75 gal 1:1 sucrose mix)

To Prepare 83 Gallons
    70.5 lb dry diet mix
    65.5 gallons of high fructose corn syrup 55
    17.5 gallons of water
    (or for 1:1 sucrose syrup 83 gal 1:1 sucrose mix)

It is understood that the foregoing detailed description is given merely by way of illustration and that modification and variations may be made within, without departing from the spirit and scope of the invention. All publications and patents cited herein are hereby incorporated by reference in their entirety.

What is claimed is:

1. A pourable, water-dispersible, substantially homogeneous artificial liquid diet formulation suitable for rearing bees, which comprises diet components comprising about 0.75-10% protein, about 0.75-5% lipid, about 25-45% carbohydrate, wherein about 98-99% of the carbohydrate is sugar including sugar that occurs naturally in the diet components and sugar from an added sugar source; about 0.05-4% ash; about 0.05-1% cholesterol; about 0.02-1.25% ascorbic acid, about 0.1-2% acidifier, about 0-3% hydrocolloid, about 0-1.5% antifungal agent, and about 45-65% liquid from liquid that naturally occurs in the diet components or added liquid or both naturally occurring and added liquid; wherein particles in the formulation are no greater than about 35 microns, and wherein the formulation has a pH of about 3.5-7.

2. The liquid diet formulation of claim 1 comprising protein and lipid sources selected from the group consisting of a soy source and an egg source, and wherein the acidifier source is an organic acid or phosphoric acid or combination thereof; wherein the hydrocolloid source is selected from the group consisting of xanthan gum, locust bean gum, an alginate, a carrageenan, gum arabic, guar gum, carboxymethycellulose, pectin, agar, and combinations thereof; and wherein the added sugar source is a solid or liquid sugar selected from the group consisting of sucrose, fructose, glucose, maltose, sugar syrup, high fructose corn syrup, and combinations thereof.

3. The liquid diet formulation of claim 2 wherein the soy source is soy flour or meal in a range of 1.5-7%; wherein the egg source is dried egg in a range of 1.5-7%, wherein the acidifier is an organic acid or phosphoric acid in the range of about 0.1-1%, wherein ascorbic acid is in the range of about 0.1 to 1%, wherein the hydrocolloid is in the range of about 0.2-3%, wherein the antifungal agent is in the range of about 0-0.3%, wherein the added sugar source is in the range of about 25-55%, and the liquid is in the range of about 45-65%.

4. The liquid diet formulation of claim 3 wherein the organic acid acidifier is citric acid, the hydrocolloid is xanthan gum, and the added sugar is sucrose or fructose or equivalent.

5. The liquid diet formulation of claim 2 wherein the soy source is soy flour or meal in a range of about 1.5-7%; wherein the egg source is dried egg in a range of about 1.5-7%, wherein the acidifier is an organic acid or phosphoric acid in the range of about 0.1-2%, wherein ascorbic acid is in the range of about 0.1-3%, wherein the hydrocolloid is in the range of about 0-1.5%, wherein the antifungal agent is in the range of about 0-0.3%, wherein the added sugar source comprises granulated sugar in a range of about 14-27% and sugar syrup and water mix in a range of about 65-85%.

6. The liquid diet formulation of claim 5 wherein the organic acid acidifier is citric acid, the hydrocolloid is xanthan gum, and the granulated sugar is sucrose or fructose or equivalent, and the sugar syrup and water mix comprises high fructose corn syrup.

7. The liquid diet formulation of claim 2 wherein the soy source is soy milk in a range of about 50-65%, wherein the egg source is whole fresh egg or fresh egg yolk in a range of about 5-15%, wherein ascorbic acid is in the range of about 0.5-1.5%, wherein the acidifier is an organic acid or phosphoric acid in the range of about 0.5-1.5%, and wherein the added sugar source is in the range of about 22-40%.

8. The liquid diet formulation of claim 7 wherein the organic acid acidifier is citric acid and the sugar is sucrose or fructose or equivalent.

9. The liquid diet formulation of claim 2 wherein the soy and egg sources comprise a soy flour and egg mix in the range of about 4.5-9%, wherein ascorbic acid is in the range of about 0.02-0.2%, wherein the acidifier is an organic acid or phosphoric acid in the range of about 0.1-0.5%, wherein the hydrocolloid is in the range of about 0.01-2%; wherein the added sugar is a sugar syrup in the range of about 70-83%, and added liquid is in the range of about 13.5-19.5%.

10. The liquid diet formulation of claim 9 wherein the organic acid acidifier is citric acid, the hydrocolloid is xanthan gum and locust bean gum, and the sugar is high fructose corn syrup.

11. A stable, dry, water-dispersible artificial honey bee diet formulation that, when combined with a liquid, provides all the dietary requirements for bees to rear multiple generations of young bees when there is an absence of natural pollen and nectar, wherein said stable, dry, water-dispersible artificial honey bee diet formulation comprises soy flour or meal in the range of about 3.4-16.1%, dried egg in the range of about 3.4-16.1%, an acidifier in the amount of about 0.2-2.3%, ascorbic acid in the range of about 0.2-2.3%, an antifungal agent in the range of about 0 to 0.68%; and sugar in the range of about 57-85%, wherein particles in the formulation are no greater than about 35 microns.

12. The stable, dry, water-dispersible artificial honey bee diet formulation of claim 11, wherein particles in the formulation are of a size that is no greater than about 27 microns.

13. The stable, dry, water-dispersible artificial honey bee diet formulation of claim 11, wherein particles in the formulation are of a size that is no greater than about 22 microns.

14. The stable, dry, water-dispersible artificial honey bee diet formulation of claim 11, wherein particles in the formulation are of a size that is no greater than about 20 microns.

15. The stable, dry, water-dispersible artificial honey bee diet formulation of claim 11, wherein the sugar is a member selected from the group consisting of sucrose, glucose, maltose, and fructose of a combination of such members.

16. The stable, dry, water-dispersible artificial honey bee diet formulation of claim 11, wherein the acidifier is a member selected from the group consisting of citric acid, acetic acid, lactic acid, malic acid, fumaric acid, pyruvic acid, phosphoric acid, and succinic acid, or a combination of such members.

17. The stable, dry, water-dispersible artificial honey bee diet formulation of claim 11, wherein the anti-fungal agent is a member selected from the group consisting of sorbic acid, sorbic acid salts, propionic acid, propionic acid salts, methyl paraben, ethylparaben, propyl paraben, butyl paraben, benzoic acid and benzoic acid salts, or a combination of such members.

18. The stable, dry, water-dispersible artificial honey bee diet formulation of claim 11, further comprising at least one hydrocolloid.

19. The stable, dry, water-dispersible artificial honey bee diet formulation of claim 18 wherein the hydrocolloid is a member selected from the group consisting of xanthan gums locust bean gum, alginic acid, alginic acid salts, carrageenan, gum Arabic, guar gum, carboxymethylcellulose, pectin, and agar or a combination of such members.

20. A stable, dry, water-dispersible artificial diet formulation for providing nutrients for feeding or rearing bees when combined with a liquid and sugar, said dry formulation comprising a soy flour or meal in the range of about 35-50%, dried egg in the range of about 35-50%, an acidifier in the amount of about 2.5-4.5%, ascorbic acid in the range of about 2.5-4.5%, and an antifungal agent in the range of about 0 to 3.6%; wherein particles in the formulation are no greater than about 35 microns.

21. A pourable, water-dispersible, substantially homogeneous artificial liquid diet formulation suitable for rearing bees, comprising a stable, dry, water-dispersible artificial honey bee diet formulation comprises soy flour or meal in the range of about 3.4-16.1%, dried egg in the range of about 3.4-16.1%, an acidifier in the amount of about 0.2-2.3%, ascorbic acid in the range of about 0.2-2.3%, an antifungal agent in the range of about 0 to 0.68%; and sugar in the range of about 57-85%, wherein particles in the formulation are no greater than about 35 microns; and liquid comprising the dry diet formulation of claim 11 and liquid.

22. A3 pourable, water-dispersible, substantially homogeneous artificial liquid diet formulation suitable for rearing bees, comprising a dry formulation comprises a soy flour or meal in the range of about 35-50%, dried egg in the range of about 35-50%, an acidifier in the amount of about 2.5-4.5%, ascorbic acid in the range of about 2.5-4.5%, and an antifungal agent in the range of about 0 to 3.6%; wherein particles in the formulation are no greater than about 35 microns; a sugar source; and liquid comprising the dry diet formulation of claim 20 and a sugar source and liquid.

23. A method of preparing a liquid diet formulation comprising the steps of providing a pourable, water-dispersible, substantially homogeneous artificial liquid diet formulation comprises diet components comprising about 0.75-10% protein, about 0.75-5% lipid, about 25-45% carbohydrate, wherein about 98-99% of the carbohydrate is sugar including sugar that occurs naturally in the diet components and sugar from an added sugar source, about 0.05-4% ash, about 0.05-1% cholesterol, about 0.02-1.25% ascorbic acid, about 0.1-2% acidifier, about 0-3% hydrocolloid, about 0-1.5% antifungal agent, and about 45-65% liquid from liquid that naturally occurs in the diet components or added liquid or both naturally occurring and added liquid, wherein particles in the formulation are no greater than about 35 microns, and wherein the formulation has a pH of about 3.5-7; and mixing together said diet components to provide a pourable, substantially homogeneous, water-dispersible liquid diet formulation.

24. A method of preparing a liquid honey bee diet formulation which comprising the steps of providing a stable, dry, water-dispersible artificial honey bee diet formulation that, when combined with a liquid, provides all the dietary requirements for bees to rear multiple generations of young bees when there is an absence of natural pollen and nectar, wherein said stable, dry, water-dispersible artificial honey bee diet formulation comprises soy flour or meal in the range of about 3.4-16.1%, dried egg in the range of about 3.4-16.1%, an acidifier in the amount of about 0.2-2.3%, ascorbic acid in the range of about 0.2-2.3%, an antifungal agent in the range of about 0 to 0.68%; and sugar in the range of about 57-85%, wherein particles in the formulation are no greater than about 35 microns; and mixing said stable, dry, water-dispersible artificial honey bee diet formulation with a liquid to provide a pourable, substantially homogeneous, water-dispersible liquid diet formulation that provides all the dietary requirements for bees to rear multiple generations of young bees when there is an absence of natural pollen and nectar.

25. The method of claim 24, wherein the liquid is a member selected from the group consisting of water, soy milk, and diluted sugar syrup, or a combination of such members.

26. A method of preparing a liquid diet formulation which comprises the steps of providing a stable, dry, water-dispersible artificial diet formulation for providing nutrients for feeding or rearing bees when combined with a liquid and sugar, said dry formulation comprising a soy flour or meal in the range of about 35-50%, dried egg in the range of about 35-50%, an acidifier in the amount of about 2.5-4.5%, ascorbic acid in the range of about 2.5-4.5%, and an antifungal agent in the range of about 0 to 3.6%; wherein particles in the formulation are no greater than about 35 microns; and mixing said diet formulation with a liquid and a sugar source to provide a pourable, substantially homogeneous, water-dispersible liquid diet formulation.

27. A method for rearing bees which comprises, providing bees with an effective bee rearing amount of a diet which comprises providing a pourable, water-dispersible, substantially homogeneous artificial liquid diet formulation suitable for rearing bees, which comprises diet components comprising about 0.75-10% protein, about 0.75-5% lipid, about 25-45% carbohydrate, wherein about 98-99% of the carbohydrate is sugar including sugar that occurs naturally in the diet components and sugar from an added sugar source; about 0.05-4% ash; about 0.05-1% cholesterol; about 0.02-1.25% ascorbic acid, about 0.1-2% acidifier, about 0-3% hydrocolloid, about 0-1.5% antifungal agent, and about 45-65% liquid from liquid that naturally occurs in the diet components or added liquid or both naturally occurring and added liquid; wherein particles in the formulation are no greater than about 35 microns, and wherein the formulation has a pH of about 3.5-7.

28. A method for rearing bees which comprises, providing bees with an effective bee rearing amount of a diet which comprises providing a pourable, water-dispersible, substantially homogeneous artificial liquid diet formulation suitable for rearing bees, which comprises diet components comprising about 0.75-10% protein, about 0.75-5% lipid, about 25-45% carbohydrate, wherein about 98-99% of the carbohydrate is sugar including sugar that occurs naturally in the diet components and sugar from an added sugar source; about 0.05-4% ash; about 0.05-1% cholesterol; about 0.02-1.25% ascorbic acid, about 0.1-2% acidifier, about 0-3% hydrocolloid, about 0-1.5% antifungal agent, and about 45-65% liquid from liquid that naturally occurs in the diet components or added liquid or both naturally occurring and added liquid; wherein particles in the formulation are no greater than about 35 microns, and wherein the formulation has a pH of about 3.5-7, wherein the protein and lipid sources selected from the group consisting of a soy source and an egg source, and wherein the acidifier source is an organic acid or phosphoric acid or combination thereof; wherein the hydrocolloid source is selected from the group consisting of xanthan gum, locust bean gum, an alginate, a carrageenan, gum arabic, guar gum, carboxymethycellulose, pectin, agar, and combinations thereof, and wherein the added sugar source is a solid or liquid sugar selected from the group consisting of sucrose, fructose, glucose, makose, sugar syrup, high fructose corn syrup, and combinations thereof; wherein the soy source is soy flour or meal in a range of 1.5-7%; wherein the egg source is dried egg in a range of 1.5-7%, wherein the acidifier is an organic acid or phosphoric acid in the range of about 0.1-1%, wherein ascorbic acid is in the range of about 0.1 to 1%, wherein the hydrocolloid is in the range of about 0.2-3%, wherein the antifungal agent is in the range of about 0-0.3%, wherein the added sugar source is in the range of about 25-55%, and the liquid is in the range of about 45-65%.

29. A method for rearing bees which comprises, providing bees with an effective bee rearing amount of a diet which comprises providing a pourable, water-dispersible, substantially homogeneous artificial liquid diet formulation suitable for rearing bees, which comprises diet components comprising about 0.75-10% protein, about 0.75-5% lipid, about 25-45% carbohydrate, wherein about 98-99% of the carbohydrate is sugar including sugar that occurs naturally in the diet components and sugar from an added sugar source; about 0.05-4% ash; about 0.05-1% cholesterol; about 0.02-1.25% ascorbic acid, about 0.1-2% acidifier, about 0-3% hydrocolloid, about 0-1.5% antifungal agent, and about 45-65% liquid from liquid that naturally occurs in the diet components or added liquid or both naturally occurring and added liquid; wherein particles in the formulation are no greater than about 35 microns, and wherein the formulation has a pH of about 3.5-7; wherein the protein and lipid sources selected from the group consisting of a soy source and an egg source, and wherein the acidifier source is an organic acid or phosphoric acid or combination thereof; wherein the hydrocolloid source is selected from the group consisting of xanthan gum, locust bean gum, an alginate, a carrageenan, gum arabic, guar gum, carboxymethycellulose, pectin, agar, and combinations thereof; and wherein the added sugar source is a solid or liquid sugar selected from the group consisting of sucrose, fructose, glucose, maltose, sugar syrup, high fructose corn syrup, and combinations thereof; wherein the soy source is soy flour or meal in a range of about 1.5-7%; wherein the egg source is dried egg in a range of about 1.5-7%, wherein the acidifier is an organic acid or phosphoric acid in the range of about 0.1-2%, wherein ascorbic acid is in the range of about 0.1-3%, wherein the hydrocolloid is in the range of about 0-1.5%, wherein the antifungal agent is in the range of about 0-0.3%, wherein the added sugar source comprises granulated sugar in a range of about 14-27% and sugar syrup and water mix in a range of about 65-85%.

30. A method for rearing bees which comprises, providing bees with an effective bee rearing amount of a diet which comprises providing a pourable, water-dispersible, substantially homogeneous artificial liquid diet formulation suitable for rearing bees, which comprises diet components comprising about 0.75-10% protein, about 0.75-5% lipid, about 25-45% carbohydrate, wherein about 98-99% of the carbohydrate is sugar including sugar that occurs naturally in the diet components and sugar from an added sugar source; about 0.05-4% ash; about 0.05-1% cholesterol; about 0.02-1.25% ascorbic acid, about 0.1-2% acidifier, about 0-3% hydrocolloid, about 0-1.5% antifungal agent, and about 45-65% liquid from liquid that naturally occurs in the diet components or added liquid or both naturally occurring and added liquid; wherein particles in the formulation are no greater than about 35 microns, and wherein the formulation has a pH of about 3.5-7; wherein the protein and lipid sources selected from the group consisting of a soy source and an egg source, and wherein the acidifier source is an organic acid or phosphoric acid or combination thereof; wherein the hydrocolloid source is selected from the group consisting of xanthan gum, locust bean gum, an alginate, a carrageenan, gum arabic, guar gum, carboxymethycellulose, pectin, agar, and combinations thereof; and wherein the added sugar source is a solid or liquid sugar selected from the group consisting of sucrose, fructose, glucose, maltose, sugar syrup, high fructose corn syrup, and combinations thereof; wherein the soy source is soy milk in a range of about 50-65%, wherein the egg source is whole fresh egg or fresh egg yolk in a range of about 5-15%, wherein ascorbic acid is in the range of about 0.5-1.5%, wherein the acidifier is an organic acid or phosphoric acid in the range of about 0.5-1.5%, and wherein the added sugar source is in the range of about 22-40%.

31. A method for rearing bees which comprises, providing bees with an effective bee rearing amount of a diet which comprises providing a pourable, water-dispersible, substantially homogeneous artificial liquid diet formulation suitable for rearing bees, which comprises diet components comprising about 0.75-10% protein, about 0.75-5% lipid, about 25-45% carbohydrate, wherein about 98-99% of the carbohydrate is sugar including sugar that occurs naturally in the diet components and sugar from an added sugar source; about 0.05-4% ash; about 0.05-1% cholesterol; about 0.02-1.25% ascorbic acid, about 0.1-2% acidifier, about 0-3% hydrocolloid, about 0-1.5% antifungal agent, and about 45-65% liquid from liquid that naturally occurs in the diet components or added liquid or both naturally occurring and added liquid; wherein particles in the formulation are no greater than about 35 microns, and wherein the formulation has a pH of about 3.5-7; wherein the protein and lipid sources selected from the group consisting of a soy source and an egg source, and wherein the acidifier source is an organic acid or phosphoric acid or combination thereof; wherein the hydrocolloid source is selected from the group consisting of xanthan gum, locust bean gum, an alginate, a carrageenan, gum arabic, guar gum, carboxymethycellulose, pectin, agar, and combinations thereof; and wherein the added sugar source is a solid or liquid sugar selected from the group consisting of sucrose, fructose, glucose, maltose, sugar syrup, high fructose corn syrup, and combinations thereof; wherein the soy and egg sources comprise a soy flour and egg mix in the range of about 4.5-9%, wherein ascorbic acid is in the range of about 0.02-0.2%, wherein the acidifier is an organic acid or phosphoric acid in the range of about 0.1-0.5%, wherein the hydrocolloid is in the range of about 0.01-2%; wherein the added sugar is a sugar syrup in the range of about 70-83%, and added liquid is in the range of about 13.5-19.5%.

32. A method for rearing bees which comprises, providing bees with an effective bee rearing amount of a diet which comprises providing a pourable, water-dispersible, substantially homogeneous artificial liquid diet formulation suitable for rearing bees comprises soy flour or meal in the range of about 3.4-16.1%, dried egg in the range of about 3.4-16.1%, an acidifier in the amount of about 0.2-2.3%, ascorbic acid in the range of about 0.2-2.3%, an antifungal agent in the range of about 0 to 0.68%; and sugar in the range of about 57-85%, wherein particles in the formulation are no greater than about 35 microns; and liquid.

33. A method for rearing bees which comprises, providing bees with an effective bee rearing amount of a diet which comprises providing a pourable, water-dispersible, substantially homogeneous artificial liquid diet formulation suitable for rearing bees comprises a soy flour or meal in the range of about 35-50%, dried egg in the range of about 35-50%, an acidifier in the amount of about 2.5-4.5%, ascorbic acid in the range of about 2.5-4.5%, and an antifungal agent in the range of about 0 to 3.6%; wherein particles in the formulation are no greater than about 35 microns; a sugar source; and a liquid.

34. A liquid honey bee diet formulation made by the method of preparing a liquid honey bee diet formulation which comprises the steps of providing a stable, dry, water-dispersible artificial honey bee diet formulation that, when combined with a liquid, provides all the dietary requirements for bees to rear multiple generations of young bees when there is an absence of natural pollen and nectar, wherein said stable, dry, water-dispersible artificial honey bee diet formulation comprises soy flour or meal in the range of about 3.4-16.1%, dried egg in the range of about 3.4-16.1%, an acidifier in the amount of about 0.2-2.3%, ascorbic acid in the range of about 0.2-2.3%, an antifungal agent in the range of about 0 to 0.68%; and sugar in the range of about 57-85%, wherein particles in the formulation are no greater than about 35 microns; and mixing said stable, dry, water-dispersible artificial honey bee diet formulation with a liquid to provide a pourable, substantially homogeneous, water-dispersible liquid diet formulation that provides all the dietary requirements for bees to rear multiple generations of young bees when there is an absence of natural pollen and nectar.

35. The liquid honey bee diet formulation of claim 34, wherein the pH of the liquid diet formulation is balanced to mimic the pH of natural pollen and wherein the pH is in a range that is between about 3.5 to about 7.0.

36. The liquid honey bee diet formulation of claim 35, wherein the pH of the liquid honey bee diet formulation is a pH that is in a range that is between about 3.7 to about 5.5.

37. The liquid honey bee diet formulation of claim 36, wherein the pH of the liquid honey bee diet formulation is a pH that is in a range that is between about 3.9 to about 4.1.

* * * * *